United States Patent [19]

Balzer

[11] Patent Number: 4,770,199

[45] Date of Patent: Sep. 13, 1988

[54] PROCESS FOR TRANSPORTING HEAVY OILS

[75] Inventor: Dieter Balzer, Haltern, Fed. Rep. of Germany

[73] Assignee: Huels Aktiengesellschaft, Marl, Fed. Rep. of Germany

[21] Appl. No.: 22,150

[22] Filed: Mar. 5, 1987

[30] Foreign Application Priority Data

Mar. 5, 1986 [DE] Fed. Rep. of Germany ....... 3607090

[51] Int. Cl.$^4$ ................................................ F17D 1/17
[52] U.S. Cl. .................................. 137/13; 252/8.551; 252/312
[58] Field of Search ................ 252/8.551, 312; 137/13

[56] References Cited

U.S. PATENT DOCUMENTS

| | | |
|---|---|---|
| 2,183,853 | 12/1939 | Haussmann . |
| 3,467,195 | 9/1969 | McAuliffe et al. . |
| 3,491,835 | 1/1970 | Gagle . |
| 4,249,554 | 2/1981 | McClaflin . |
| 4,265,264 | 5/1981 | Sifferman . |
| 4,285,356 | 8/1981 | Sifferman . |
| 4,293,428 | 10/1981 | Gale et al. ......................... 252/8.554 |
| 4,457,373 | 7/1984 | Balzer et al. . |
| 4,478,281 | 10/1984 | Balzer et al. . |
| 4,485,873 | 12/1984 | Balzer et al. . |

Primary Examiner—Herbert B. Guynn
Attorney, Agent, or Firm—Millen & White

[57] ABSTRACT

The invention relates to a process for the transport of heavy oil wherein an emulsifier-containing oil-in-water emulsion with at least 10–15% of water is transported and subsequently separated again into crude oil and water. The emulsifier employed is a carboxymethylated oxalkylate of the formula

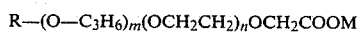

$$R-(O-C_3H_6)_m(OCH_2CH_2)_nOCH_2COOM$$

wherein
R is saturated or unsaturated, linear or branched aliphatic residue of 6–20 carbon atoms, an alkylaromatic residue to 4–16 carbon atoms in the alkyl group, a dialkylaromatic residue of, in total, 5–20 carbon atoms in the alkyl groups, or a trialkylaromatic residue of, in total, 7–24 carbon atoms in the alkyl groups,
m is 1 to 30,
n is 1 to 40, and
M is an alkali or alkaline earth metal ion or ammonium.

19 Claims, No Drawings

PROCESS FOR TRANSPORTING HEAVY OILS

BACKGROUND OF THE INVENTION

Heavy oils and extremely heavy oils can be transported in pipelines only with difficulty under conditions of ordinary outside temperatures, because of their very high viscosity. In order to raise their mobility, they are, therefore, frequently mixed with low-viscosity crude oils or refinery cuts; such a mode of operation requires relatively high quantities of additives to obtain any marked improvement in flow. In addition, such a procedure is feasible only where light-oil fields exist at the same site, or where a refinery in the vicinity can deliver low-viscosity gasoline fractions.

Another method that has also been employed resides in supplying heat to the heavy oil to lower its viscosity and correspondingly to improve its fluidity; considerable amounts of heat must be expended for this purpose. Thus, it is necessary, for example, to heat a heavy oil of 10.3° API, the viscosity of which at 20° C. is 40,000 mPa(s), to a temperature of about 95° C. to obtain a viscosity of about 100 mPa(s), a threshold value frequently required for oil transportation in pipelines (M. L. Chirinos et al., Rev. Tec. Intevep. 3 (2): 103 [1983]). This means extremely high financial outlays for equipping and supplying the pipelines, and a loss of 15-20% of crude oil, since the necessary amount of heat is customarily obtained by combustion of crude oil.

Another method for heavy oil transport resides in pumping the oil through the pipelines in the form of a more or less readily fluid emulsion. Since the viscosity of emulsions is determined quite predominantly by that of the dispersant, an oil-in-water emulsion is involved here. The oil-in-water emulsion is produced by adding water and emulsifier to the oil using shear forces. This mixture is then pumped into the pipeline. The emulsion is subsequently separated into oil and water in a settling tank, for example before entering the refinery. The thus-separated oil is introduced into the refinery. The emulsifier, or minimum concentration, should produce a stable, readily fluid oil-in-water emulsion with a very high proportion of oil. This naturally poses high requirements on the emulsifiers. High shear forces must likewise be avoided during emulsification since the danger exists of inversion into a water-in-oil emulsion, extremely highly viscous in the case of crude oils. Furthermore, the emulsions should be stable with respect to relatively high salinities which occur in many deposit systems, as well as with respect to elevated temperatures. Further, despite exhibiting adequate stability while flowing through the pipeline, the emulsions should be separable again with minimum problems. Sulfur-containing emulsifiers are undesirable unless it is possible to maintain them in the aqueous phase during the separating step.

The emulsifiers proposed heretofore do not as yet adequately fulfill the aforementioned conditions. In many cases (for example, U.S. Pat. Nos. 4,285,356, 4,265,264 and 4,249,554), emulsions have oil contents of merely 50%; this means that half the pipeline volume is unavailable for actual oil transport. In other instances (for example Canadian Pat. Nos. 1,108,205, 1,113,529, 1,117,568, as well as U.S. Pat. No. 4,246,919), the reduction in viscosity attained by the addition of emulsifier is small, despite the relatively low oil proportion. And, finally, undesirable emulsifiers based on sulfur are frequently utilized.

SUMMARY OF THE INVENTION

Therefore, it is an object of the invention to provide emuslifiers for the emulsification of heavy oil in water for heavy oil transport in pipelines, which emulsifiers do not exhibit the above-discussed drawbacks but rather correspond essentially to the aforementioned array of desirable properties.

Upon further study of the specification and appended claims, further objects and advantages of this invention will become apparent to those skilled in the art.

These objects have been attained by utilizing as the emulsifier carboxymethylated oxalkylates of the formula

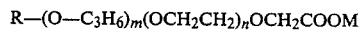

wherein
- R is a saturated or unsaturated, linear or branched aliphatic residue of 6–20 carbon atoms, an alkylaromatic residue of 4–16 carbon atoms in the alkyl group, a dialkylaromatic residue of, in total, 5–20 carbon atoms in the alkyl groups, or a trialkylaromatic residue of, in total, 7–24 carbon atoms in the alkyl groups,
- m is 1 to 30, preferably 2 to 20,
- n is 1 to 40, preferably 3 to 20, and
- M is an alkali or alkaline earth metal ion or ammonium.

DETAILED DISCUSSION

Advantageously, the carboxymethylated oxalkylates are produced by reacting the oxalkylates of the formula

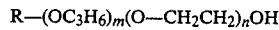

with chloroacetic acid or with a salt of chloroacetic acid in the presence of an alkali metal hydroxide or alkaline earth metal hydroxide, e.g., according to German Pat. No. 2,418,444, which disclosure is incorporated by reference herewith. However, other methods for preparation are likewise suitable, e.g., those of U.S. Pat. Nos. 4,478,284, 4,542,790, 4,485,873 and 4,563,318, all commonly assigned, which disclosure is incorporated by reference herewith.

In the above formula, R means a hydrocarbon saturated or unsaturated, straight-chain or branched alkyl or alkenyl residue of 6-20, preferably 8-18 carbon atoms, or a hydrocarbon alkylaryl residue of 4-16, preferably 6-14 carbon atoms in the alkyl group, or a hydrocarbon dialkylaryl residue of, in total, 5-20, preferably 7-18 carbon atoms in the alkyl groups, or a hydrocarbon trialkyl-aromatic residue of, in total, 7-24, preferably 9-22 carbon atoms in the alkyl groups. The aryl residue generally has 6-10 C atoms, e.g., phenyl or naphthyl. Examples of alcohols that can be used for carboxymethylation of their oxalkylates are: hexyl alcohol, octyl alcohol, 2-ethylhexyl alcohol, nonyl alcohol, isononyl alcohol, decyl and undecyl alcohol, lauryl, tridecyl, myristyl, palmityl, and stearyl alcohol, and also unsaturated alcohols for example, oleyl alcohol and the like. Commercially available mixtures of these alcohols are also suitable. Examples of suitable alkyl phenols are, for example: pentylphenol, hexylphenol, octylphenol, nonylphenol, dodecylphenol, hexadecylphenol, as well as the corresponding di- and trialkyl phenols, e.g., dibutylphenol, dihexylphenol, tributylphenol and tripentylphenol.

The oxalkylation of the alcohols or alkyl phenols can be performed in the presence of catalytic amounts of alkali metal hydroxide with 1-30 moles of propylene oxide/mole of hydroxy compound, and thereafter with 1-40 moles of ethylene oxide/mole. However, as is known, other methods are likewise possible. The carboxymethylates can be produced from the oxalkylates, for example, by reacting with a salt of chloroacetic acid in the presence of an alkali metal or alkaline earth metal hydroxide (German Pat. No. 2,418,444). The cation in the carboxymethylated oxalkylate having the formula $$R\text{—}(OC_3H_6)_m(OC_2H_4)OCH_2\text{—}COOM$$

can be sodium, potassium, lithium, ammonium, calcium, magnesium, hydrogen, etc.

The emulsifiers employed are predominantly anionic so that the stabilized emulsion can be broken without any problems. The compounds are stable thermally and compatible with salt-containing water within extremely wide limits (U.S. Pat. No. 4,457,373, which disclosure is incorporated by reference herein). Furthermore, they permit optimum adaptation of the emulsifier to the oil to be transported and to the given salinity of the water entrained in most cases from the deposit, by varying the hydrophobic alkyl residue, the degree of propoxylation, and the degree of oxethylation. The mentioned deposit water suitably forms the aqueous phase of the emulsions to be transported.

In correspondence with their manufacture, the carboxymethylated oxalkylates can contain unreacted oxalkylate. Accordingly, a degree of carboxymethylation can be defined. The formulae $$R\text{—}(O\text{—}C_3H_6)_m(OCH_2CH_2)_nOCH_2COOM \text{ and}$$
$$R\text{—}(OC_3H_6)_m\text{—}OH$$

therefore can be used to characterize the mixture containing varying amounts of unreacted oxalkylate. The degree of carboxymethylation (i.e., content of compounds of the first formula) generally is about 40 to 100% by weight, and preferably is about 50 to 100% by weight. Especially effective are mixtures having a degree of carboxymethylation of about 85 to 100% by weight. Such mixtures thus comprise anionic and nonionic tensides and are considered to be "carboxymethylated oxalkylates" according to this invention.

The aforedescribed mixtures of anionic and nonionic tensides, or the purely anionic compounds (emulsifier), are soluble or at least dispersible without problem in the usual deposit waters.

In preliminary tests, the emulsifier to be used can be optimally adjusted in correspondence with its chemical structure to the existing heavy oil - water system.

The tensides (emulsifiers) of a homologous series (obtained, for example, by varying the degree of propoxylation, cf. Table A), are, for example, dissolved in the deposit water and mixed with the respective heavy oil and, after brief agitation with a blade-type mixer without application of high shear forces, can be tested for their emulsifying effect, and the stability of the emulsion can be determined according to conventional protocol. Evaluation of the emulsion can be repeated about 24 hours later, and if desired, the viscosity measured in dependence on the shear rate. Since heavy oil emulsions are, in part, somewhat structurally viscous, a range of 10 to 100 sec$^{-1}$ is usually chosen for the shear rate, corresponding approximately to transport through pipelines. A tenside is an optimum emulsifier if the amount required for emulsification is minimal.

The amount of emulsifier is generally 0.01 to 0.5% by weight, especially 0.03-0.2% by weight, based on the amount of oil, which corresponds to 100 to 5,000 ppm, preferably 300-2,000 ppm. The emulsifier, for "heavy oil liquefaction", can be added in metered amounts to the oil-water mixture either as a melt or as an aqueous solution or as a dispersion, or it can also be added to the water which is then mixed with the oil. In this connection, water herein means either a more or less saline water produced together with the heavy oil, or it can be a cheaply available surface water or also a mixture of both waters. Since heavy oil fields are frequently extracted by steam flooding, the salinity of the evolving water can fluctuate somewhat; this causes no problems for the process of the invention.

Instead of metering the emulsifier into the water, the emulsifier can also be added to the heavy oil proper, especially since the class of tensides claimed herein shows good oil solubility. In certain circumstances, it may be advantageous to use a small amount of highly fluid hydrocarbon mixture as the solubilizer. Mixing of the three components for formation of the emulsion, namely oil, water, and emulsifier, can take place either directly at the drilled well or in or close to a collecting tank, or at any other point of the pipeline system.

A variation of the process resides in injecting the emulsifier liquid into the lower portion of the production well in order to facilitate the flow of heavy oil in the production pipeline. This methodology is especially recommended in case of a low gas-oil ratio.

Viscous oils for use in this invention include all which are not of sufficiently low viscosity for satisfactory transport in a pipeline. This invention is applicable to all oil compositions and is effective over the full range of salinities encountered in the field, e.g., 0-25% by weight of the usual salts, e.g., alkali metal and alkaline earth metal salts.

The mixture ratio by weight of oil to water can fluctuate within wide limits, e.g., 10:90 to 90:10. High oil contents are desirable for economical reasons, but very high oil contents in most cases also result in relatively highly viscous oil/water emulsions and promote phase inversion which should be avoided. Therefore, the economical optimum will usually range, depending upon the system, at an oil content of about 70 to 85%, e.g., preferably about 10-15% by weight of water.

By "heavy" oil herein is meant oils of 5°-15° API-gravity.

Temperatures at which the emulsifiers are particularly effective are 10°-60° C., preferahle 15°-40° C.

Emulsification, as is known, is enhanced by mixing devices, such as agitator installations, impeller pumps, static mixers, etc., which are used where needed. The thus-formed emulsion is conveyed through the pipeline system which latter can comprise intermediate stations and interposed storage tanks. At the end point of the pipeline, the emulsion is conventionally broken up in a separator; in this connection, it may be advantageous to add one or more demulsifiers.

The thus-dewatered crude oil is discharged and thereafter passed on either to the refinery or to possible further transport, for example by ship.

Unless indicated otherwise herein, all details of the emulsification, transport and demulsification are conventional, e.g., as disclosed in M. L. Mao and S. S. Marsden, *The Journal of Canadian Petroleum Technology*, 1977, Apr.–June, pg. 54, which disclosure is incorporated by reference herewith.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLES

In a glass vessel or polyethylene beaker having a capacity of about 200 ml, 75 g of heavy oil and respectively 25 g of the cited aqueous tenside solution, which furthermore contains a neutral electrolyte, are stirred together at room temperature by means of a simple blade-type agitator (about 100 rpm). If the added tenside is effective, and its amount sufficient, then an emulsion is formed having a uniform appearance. The mixture is then allowed to stand for about 24 hours at room temperature and the uniformity of the mixture is again examined; during this step, the mixture—if necessary—is stirred somewhat with a glass rod. If a readily fluid, uniform emulsion has formed, its viscosity is measured—as described above. The minimum emulsifier concentration (percent by weight, based on the oil quantity) of the respective tenside is recorded which is required for producing an approximately stable emulsion. "Approximately stable" here means that even slight stirring with the glass rod suffices to reestablish the original uniformity, if the latter had been lost at all.

The heavy oils employed were 2 Venezuelan crude oils: Boscan oil (about 10° API, viscosity at 20° C. 180,000 mPa.s, setting point 7° C.) and CN oil (about 8° API, viscosity at 20° C. about 3,000,000 mPa.s, setting point 18° C.).

With the aid of the examples compiled in the tables below, the generally high efficacy of the carboxymethylated oxalkylates as heavy oil emulsifiers for o/w emulsions is demonstrated. It is shown furthermore that the efficacy of the tenside can be optimized by means of varying the chemical structure by changing the degree of propoxylation (Tables A, C and D) and, respectively, the degree of oxethylation (Table B). A comparison of Tables A and D demonstrates that the high emulsifying efficacy is present in case of both oils. The effect of salinity in the salinity range (20,000–50,000 ppm) here under consideration is not particularly great, as can be derived from a comparison of Tables C and D. The utility of introducing a PO group into the emulsifier molecule is demonstrated in Examples 20 and 21 as compared with Example 19.

Heavy oils to be emulsified and to be transported in accordance with this invention are, for example, those with an API of below 18°.

TABLE A

Minimum Emulsifier Concentration in Case of Carboxymethylated Nonylphenol Oxalkylate Sodium Salts wherein n = 6 (mol Ethylene Oxide/mol; Degree of Carboxymethylation about 75%) in Dependence on Degree of Propoxylation, Boscan Oil, Water Salinity 50,000 ppm NaCl

| Example No. | PO Degree (mol/mol) | Minimum Concentration (%) | Viscosity at 20° C. (mPa · s) |
|---|---|---|---|
| 1 | 1 | 0.05 | 110 |
| 2 | 3 | 0.065 | 80 |
| 3 | 4 | 0.075 | 100 |
| 4 | 5 | 0.1 | 90 |
| 5 | 6 | 0.2 | 160 |
| 6 | 8 | >0.3 | — |

TABLE B

Minimum Emulsifier Concentration in Case of Carboxymethylated Nonylphenol Oxalkylate Sodium Salts wherein m = 3 (mol Propylene Oxide/mol); Degree of Carboxymethylation about 75%) in Dependence on Degree of Oxethylation, Boscan Oil, Salinity 50,000 ppm NaCl

| Example No. | EO Degree (mol/mol) | Minimum Concentration (%) | Viscosity at 20° C. (mPa · s) |
|---|---|---|---|
| 7 | 3.5 | >0.5 | — |
| 8 | 4.5 | 0.3 | 460 |
| 9 | 5.2 | 0.15 | 160 |
| 10 | 5.5 | 0.1 | 130 |
| 11 | 6.0 | 0.065 | 80 |
| 12 | 12 | >0.4 | — |

TABLE C

Minimum Emulsifier Concentration in Case of Carboxymethylated Nonylphenol Oxalkylate Sodium Salts wherein n = 6 (mol Ethylene Oxide/mol; Degree of Carboxymethylation about 75%) in Dependence on Degree of Propoxylation, CN Oil, Salinity 20,000 ppm NaCl

| Example No. | PO Degree (mol/mol) | Minimum Concentration (%) | Viscosity at 40° C. (mPa · s) |
|---|---|---|---|
| 13 | 1 | 0.05 | 60 |
| 14 | 3 | 0.05 | 70 |
| 15 | 4 | 0.075 | 70 |
| 16 | 5 | 0.075 | 60 |
| 17 | 6 | 0.1 | 70 |
| 18 | 8 | >0.2 | — |

TABLE D

Minimum Emulsifier Concentration in Case of Carboxymethylated Nonylphenol Oxalkylate Sodium Salts wherein n = 6 (mol Ethylene Oxide/mol; Degree of Carboxymethylation about 75%) in Dependence on the Degree of Propoxylation, CN Oil, Salinity 50,000 ppm NaCl

| Example No. | PO Degree (mol/mol) | Minimum Concentration (%) | Viscosity at 40° C. (mPa · s) |
|---|---|---|---|
| 19 | 0 | 0.075 | 100 |
| 20 | 1 | 0.040 | 80 |
| 21 | 3 | 0.050 | 90 |
| 22 | 4 | 0.1 | 80 |
| 23 | 5 | 0.2 | 160 |
| 24 | 6 | >0.2 | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for transporting a viscous heavy crude oil having a gravity of 5°–15° API through a pipeline, comprising forming an oil-in-water emulsion of said crude oil by admixing therewith water and an emulsifier which is:

40–100% by weight of a carboxymethylated oxalkylate of the formula $$R-(O-C_3H_6)_m(OCH_2CH_2)_nOCH_2COOM$$

and 60–0% by weight of an ethoxylate of the formula $$R-(O-C_3H_6)_m(OCH_2CH_2)_n-OH$$

wherein
R is a hydrocarbon aliphatic group of 6–20 carbon atoms, a hydrocarbon ($C_{4-16}$-alkyl)-$C_{6-10}$-aromatic group, a hydrocarbon di-($C_{5-20}$-alkyl)-$C_{6-10}$-aromatic group, or a tri-($C_{7-24}$-alkyl)-$C_{6-10}$-aromatic group,
m is 1 to 30,
n is 1 to 40, and
M is an alkali metal or alkaline earth metal cation or ammonium, and transporting said oil-in-water emulsion through said pipeline.

2. A process according to claim 1, wherein the emulsifier comprises 50–100% by weight of the carboxymethylated oxalkylate.

3. A process according to claim 1, wherein the emulsifier comprises 85–100% by weight of the carboxymethylated oxalkylate.

4. A process according to claim 1, wherein the amount of water in the emulsion is at least about 10% by weight.

5. A process according to claim 4, wherein the emulsifier concentration, based on the oil quantity, is 0.01–0.5% by weight.

6. A process of claim 5, wherein the amount of oil in the emulsion is 70–85 wt. %.

7. A process of claim 1, wherein R is alkyl or alkenyl of 8–18 C-atoms.

8. A process of claim 1, wherein R is ($C_{6-14}$-alkyl)phenyl, di($C_{7-18}$-alkyl)phenyl or tri($C_{9-22}$-alkyl)phenyl.

9. A process of claim 1, wherein m is 2–20.

10. A process of claim 1, wherein n is 3–20.

11. A process of claim 5, wherein the emulsifier concentration is 0.03–0.2% by weight.

12. A process of claim 1, wherein the water in the emulsion is saline water.

13. A process of claim 3, wherein the emulsifier comprises essentially no ethoxylate.

14. A process of claim 1, further comprising, after the transporting step, breaking down the emulsion into separated crude oil and water.

15. A process of claim 1, wherein the heavy oil has a viscosity at 20° C. of at least about 180,000 mPa(s).

16. A process of claim 1, wherein the heavy oil has a gravity of 8°–10° API.

17. A pipeline-transportable oil-in-water emulsion comprising 70–90% by weight of heavy crude oil having a gravity of 5°–15° API, water and 0.01 to 0.5% by weight, based on the amount of oil, of an emulsifier which is 40–100 wt. % of a carboxymethylated ethoxylate of the formula $$R-(O)-C_3H_6)_m(OCH_2CH_2)_nOCH_2COOM$$

and 60–0 wt. % of an ethoxylate of the formula $$R-(O-C_3H_6)_m(OCH_2CH_2)_n-OH$$

wherein
R is a hydrocarbon aliphatic group of 6–20 carbon atoms, a hydrocarbon ($C_{4-16}$-alkyl)-$C_{6-10}$-aromatic group, a hydrocarbon di-($C_{5-20}$-alkyl)-$C_{6-10}$-aromatic group, or a tri-($C_{7-24}$-alkyl)-$C_{6-10}$-aromatic group;
m is 1 to 30,
n is 1 to 40 and
M is an alkali metal or alkaline earth metal cation or ammonium.

18. of claim 17, wherein the amount of emulsifier is 0.03–0.2 wt. %.

19. An emulsion of claim 17, wherein the heavy oil has a viscosity at 20° C. of at least about 180,000 mPa(s).

* * * * *